United States Patent
Prochazka

(10) Patent No.: US 12,509,089 B2
(45) Date of Patent: Dec. 30, 2025

(54) METHOD FOR ADAPTING THE DRIVING PERFORMANCE OF A VEHICLE

(71) Applicant: AUDI AG, Ingolstadt (DE)

(72) Inventor: Philipp Prochazka, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 156 days.

(21) Appl. No.: 18/447,253

(22) Filed: Aug. 9, 2023

(65) Prior Publication Data

US 2024/0051543 A1 Feb. 15, 2024

(30) Foreign Application Priority Data

Aug. 10, 2022 (DE) .......................... 102022120171.6

(51) Int. Cl.
*B60W 30/188* (2012.01)
*B60W 10/04* (2006.01)
*B60W 40/02* (2006.01)

(52) U.S. Cl.
CPC .......... *B60W 30/188* (2013.01); *B60W 10/04* (2013.01); *B60W 40/02* (2013.01); *B60W 2530/16* (2013.01); *B60W 2720/106* (2013.01)

(58) Field of Classification Search
CPC .... B60W 30/188; B60W 10/04; B60W 40/02; B60W 2530/16; B60W 2720/106; B60W 2050/0075; B60W 50/0098; B60W 2552/15; B60W 2555/20; B60W 40/12; B60L 15/20; F02D 41/02
USPC ....................................... 701/69–70
See application file for complete search history.

(56) References Cited

U.S. PATENT DOCUMENTS 9,988,057 B2 6/2018 Flaum et al.
2020/0391740 A1* 12/2020 Magolan ............... B60W 10/06

FOREIGN PATENT DOCUMENTS

| CN | 111497857 A | 8/2020 |
| DE | 102013008839 A1 | 11/2014 |
| DE | 102015010581 A1 | 2/2017 |

(Continued)

OTHER PUBLICATIONS

Yang et al.; CN113158407A.translate; Chery Commercial Vehicle Anhui Co Ltd; New energy automobile power matching method. (Year: 2021).*

(Continued)

*Primary Examiner* — B M M Hannan
(74) *Attorney, Agent, or Firm* — Seed Intellectual Property Law Group LLP

(57) ABSTRACT

The disclosure relates to a method for adapting the driving performance of a vehicle, including: saving a definition of a desired driving performance of a vehicle in a memory of a drive controller of the vehicle, saving a definition of a base driving resistance of the vehicle in the memory of the drive controller of the vehicle, saving a definition of a behavior of a drive motor of the vehicle, including an engine speed/power correlation of the drive motor, in the memory of the drive controller of the vehicle, calculating a required nominal drive power of the vehicle needed to achieve the desired driving performance, and regulating current drive power of the vehicle according to the nominal drive power calculated by the drive controller. The disclosure further relates to a drive controller as well as a vehicle having a drive controller.

11 Claims, 1 Drawing Sheet

(56) References Cited

FOREIGN PATENT DOCUMENTS

DE    102015224435  A1    6/2017
WO      2012137016  A2   10/2012

OTHER PUBLICATIONS

Staiger et al.; WO2005124193A1.translate; Method and Device for Influencing the Transmission Ratio of Avehicle Transmission. (Year: 2005).*
Dirk et al.; DE102019124584B3.translate; Porsche AG; Verfahren zur Unterstützung eines Fahrenden eines Kraftfahrzeugs im Fall einergezielten Leistungsbegrenzung einer Antriebseinrichtung und Assistenzsystem. (Year: 2020).*

* cited by examiner

METHOD FOR ADAPTING THE DRIVING PERFORMANCE OF A VEHICLE

BACKGROUND

Technical Field

The disclosure relates to a method for adapting the driving performance of a vehicle, involving the steps: A) definition of a desired driving performance of a vehicle, wherein this desired driving performance is saved in a memory of a drive controller of the vehicle, B) definition of the base driving resistance of the vehicle, for which physical data on the vehicle are saved in the memory of a drive controller of the vehicle, C) definition of the behavior of a drive motor of the vehicle, for which an engine speed/power correlation of this drive motor is saved in the memory of the drive controller of the vehicle, D) calculation of the required nominal drive power of the vehicle needed to achieve the memorized desired driving performance and E) regulation of the current drive power of the vehicle according to the calculated nominal drive power by the drive controller. The disclosure further relates to a drive controller as well as a vehicle having a drive controller.

Description of the Related Art

In vehicle design it is customary to make use of vehicle platforms. Such a vehicle platform is used as the basis for different vehicles or vehicle types. In this way, a number of components can be used for different vehicle types, which significantly reduces the development costs, production costs, and logistical expense as compared to individually designed vehicles. Since the vehicles or vehicle types based on a vehicle platform often differ significantly in terms of shape, size, and specified driving performance, a special drive regulation is usually required for the drive unit of these vehicle types. This special drive regulation governs the drive power and thus the driving performance of the vehicle in a drive controller. This special drive regulation then takes into account the specified driving performance as well as the physical parameters of the vehicle which cause a power loss. The drawback in this concept is that a special drive regulation needs to be provided for each vehicle or for each vehicle type of a vehicle platform, and despite the simplification of the components thanks to the platform principle there is greater expense and complexity in the drive regulation for the configuration of the individual vehicles or vehicle types. On the other hand, the use of an identical drive regulation for all vehicles has the disadvantage that, owing to the difference in size and weight of the vehicles, not all vehicles of a platform will achieve the specified driving performance.

DE102013008839A1 discloses a method and a device for determining the weight of a motor vehicle. In the method, the present weight of a vehicle is determined on the basis of the power theorem of mechanics. The drive power, the speed of the vehicle, and the driving resistances to be overcome go into the method.

In CN111497857A, a method is disclosed for the optimal utilization of electrical drive energy. In this method, a mathematical model of the vehicle is constructed, into which go the velocity, the drive power and the current driving resistances. Based on this model, the optimal torque of the drive is then calculated, for which the drive has the highest efficiency.

WO2012137016A2 describes a method for estimating the fuel consumption of a vehicle. In this method, the energy consumption of the vehicle is calculated by adding up the currently required driving performances and then divided by the energy value of the fuel used.

BRIEF SUMMARY

Embodiments of the disclosure provide solutions with which the driving performance of different vehicles of a vehicle platform can be adapted in simplified manner for each vehicle type.

Embodiments of the disclosure provide a method for adapting the driving performance of a vehicle, involving the steps: A) definition of a desired driving performance of a vehicle, wherein this desired driving performance is saved in a memory of a drive controller of the vehicle, B) definition of the base driving resistance of the vehicle, for which physical data on the vehicle from the group including: weight, drag coefficient, front face and rolling resistance are saved in the memory of a drive controller of the vehicle, C) definition of the behavior of a drive motor of the vehicle, for which an engine speed/power correlation of this drive motor is saved in the memory of the drive controller of the vehicle, D) calculation of the required nominal drive power of the vehicle needed to achieve the memorized desired driving performance, this calculation being based on the base driving resistance as defined in step B) and on the behavior of the drive motor as defined in step C) and E) regulation of the current drive power of the vehicle according to the calculated nominal drive power by the drive controller.

The method according to the disclosure simplifies the needs-based adapting of the driving performance, especially for different vehicle types which are based on a common vehicle platform. For this, at the start of the method, some vehicle type-specific data or parameters are defined. The last steps of the method are very similar or identical for use in different vehicle types. In this way, the complexity of the method is reduced, which at the same time reduces the tendency to make mistakes and the costs for implementing the method in the vehicle or by a drive regulation. The method according to the disclosure is preferably carried out in the indicated sequence of steps A) to E).

In a first step A) of the method, a driving performance of a vehicle is defined and saved in the drive controller. Preferably this driving performance involves the acceleration of the vehicle, especially an acceleration which is defined by the time required to reach a speed of 100 km/h starting from zero. This desired driving performance can be defined in various ways. For example, this desired driving performance can be provided by input to the drive controller the first time the vehicle is placed in operation.

In a second step B) of the method, the base driving resistance of the vehicle is defined and saved in memory. This base driving resistance can be composed of many individual driving resistances, for example, the air drag and the rolling resistance, which work against propulsion during the movement of the vehicle. During the operation of the vehicle, the drive is required to produce at least the power needed to counteract the power loss due to the base driving resistance. Furthermore, the drive is required to provide additional power in order to move the vehicle, especially to accelerate it. The physical data for calculating the base driving resistance can be entered in various ways in the drive controller. For example, these data can likewise be entered in the drive controller the first time the vehicle is placed in operation.

In a third step C) of the method, the behavior of at least one drive motor is defined. For this, an engine speed/power correlation is stored in the drive controller, for example, in the form of a characteristic curve. This engine speed/power correlation defines which power is developed by the drive motor at which engine speed. This relationship between engine speed and power will later be needed when regulating the current drive power of the vehicle by the drive controller. Furthermore, alternatively or additionally, the behavior of the drive motor during a load shift and/or the load build-up behavior of the drive motor can be saved in the memory of the drive controller of the vehicle in step C) of the method. The method according to the disclosure can be applied to both electric drive motors and those working on the combustion principle. In particular, in the case of a drive motor designed as a combustion engine, it is advantageous to define the behavior of the drive motor in time during a load shift and/or during a load build-up. For example, a drive motor designed as a turbocharged engine needs a certain amount of time until the charging pressure needed to put out a given drive power has been built up. The definition of the behavior of the drive motor in time during a load shift and/or during a load build-up improves the adapting of the current driving performance of the vehicle when transitioning between different operating states.

In a fourth step D) of the method, the required nominal driving performance needed to achieve the previously defined desired driving performance is now calculated by the controller. The physical data on the base driving resistance from step B) of the method and the engine speed/power correlation from step C) go into this calculation. The calculation can be done, for example, by first calculating a power loss from the base driving resistance of the vehicle. After this, or at the same time, the required drive power to achieve the desired driving performance is calculated. The input quantity for this calculation of the drive power can be, for example, a nominal acceleration representing a desired driving performance. The required nominal drive power then results from the power loss added to the additionally required drive power. It is advantageous that step D) of the method is already identical for all vehicle types of a vehicle platform, and only the data entered and saved in steps A) to C) of the method may differ from each other in different vehicle types.

In a fifth step E) of the method, the drive controller regulates the required drive power of the vehicle resulting from the previously calculated nominal drive power and the engine speed/power correlation of the drive motor. Step E) of the method is also identical for all vehicle types of a vehicle platform.

The method according to the disclosure at first involves three steps in which data of a specific vehicle are simply entered or defined. The last two steps of the method then regulate the driving performance of the vehicle based on these data, these two steps of the method being performed identically for different vehicle types. In this way, a drive regulation or software which carries out the method according to the disclosure by a drive controller can be reduced in its complexity. The method according to the disclosure thus simplifies the adapting of the driving performance of different vehicles of a vehicle platform.

In one embodiment of the method, it is proposed that, between step C) and step D), there is performed a step B1), in which an additional driving resistance of the vehicle is ascertained, for which at least one sensor is provided, which ascertains data about the vehicle from the group including: outdoor temperature, interior temperature, angle of inclination, electrical energy consumption, and flow velocity of the air against the vehicle, and based on the data ascertained by the sensor the presently occurring additional driving resistance in addition to the base driving resistance is calculated by the drive controller, wherein the calculation of the required nominal drive power of the vehicle in step D) is additionally based on the calculated additional drag from step B1). In this embodiment, a current additional driving resistance is ascertained in addition to the base driving resistance in a further step B1) of the method. This additional driving resistance is caused by external influences on the vehicle which are variable over time. The base driving resistance as defined in step B) of the method is a theoretical value, calculated from constant physical data of the vehicle, such as its front face. The additional driving resistance is a driving resistance which may be formed from many partial resistances and it depends on the current driving situation. For example, a head wind can be modeled in such an additional driving resistance, which works against the movement of the vehicle. Currently detected actual data on the vehicle and its surroundings go into the computation of the additional driving resistances. At least one sensor is provided for this, which detects such data and relays them directly or indirectly to the drive controller. In order to compute the nominal drive power of the vehicle, the base driving resistance and the additional driving resistance are added as input quantities in this embodiment of the method. Alternatively, it is possible to calculate an additional power loss in step B1) of the method directly from the additional driving resistance, which is added after step D) of the method to the nominal drive power calculated in that step. Furthermore, it is possible to measure the actual driving performance of the vehicle after step E) of the method and compare it to the nominal drive power as defined in step A) of the method. This additional step of the method can be provided in combination with the described step B1) of the method or as an alternative to it. The measurement of the actual driving performance and the comparison of this actual driving performance with the desired driving performance makes it possible to identify undetected losses due to an undetected driving resistance and compensate for them in an additional regulatory circuit in the method.

In another embodiment it is proposed that, in step B) definition of the base driving resistance, the base driving resistance is defined by B2) inputting of the components installed in the vehicle from the group including: chassis, drive motors, tires, and accessory equipment, in the drive controller or in another controller which relays the data to the drive controller, and B3) followed by calculating of the base driving resistance in the drive controller or in another controller which relays the data to the drive controller. In this embodiment, for the definition of the base driving resistance, the components installed in the vehicle are entered directly or indirectly in the drive controller. The components define the vehicle type. For example, in this step the size and shape of the chassis as well as the nature and size of the tires are entered. In a second step, the base driving resistance is then calculated based on the components entered. This computation can be performed either in the drive controller or also in another controller.

In an alternative embodiment it is proposed that, in step B) definition of the base driving resistance, the base driving resistance is defined by B4) direct inputting of the calculated base driving resistance upon delivery of the vehicle in the drive controller or in another controller which relays the base driving resistance to the drive controller or B5) selection of a base driving resistance from a plurality of already calculated base driving resistances which are saved in memory upon delivery of the vehicle according to a selection criterion at the drive controller or at another controller which relays the selected base driving resistance to the drive controller. In this alternative embodiment of the method, the base driving resistance is entered or selected directly. The computation of the base driving resistance is performed already prior to the method. In an alternative embodiment, the calculated base driving resistance for a vehicle type is entered directly or indirectly in the drive controller before or upon delivery of the vehicle. In an alternative embodiment, multiple base driving resistances are saved in the drive controller, especially those of different vehicle types, and only the suitable base driving resistance is selected from them. This selection is done by a selection criterion, which can be the vehicle type for example. The selection can also be done through a coding, which produces a correlation between the vehicle type and the suitable base driving resistance.

In one embodiment it is proposed that the desired driving performance is an acceleration of the vehicle, especially a mean acceleration of the vehicle from zero to a speed of 100 km/h in a nominal acceleration time. In this embodiment, the desired driving performance as defined in step A) of the method is an acceleration of the vehicle. The attainable acceleration is dependent on the driving situation, the engine speed, and many other factors. Therefore, the time required for the vehicle to accelerate from zero to a speed of 100 km/h is often defined as the acceleration.

In another embodiment it is proposed that, in step D), during the calculation of the required nominal drive power of the vehicle, at first a driving resistance performance to be overcome by the vehicle drive is calculated from the base driving resistance, especially that combined with the additional driving resistance, and this driving resistance performance is added to the desired driving performance as defined in step A) and from this sum the required nominal drive power is determined. In this embodiment, when calculating the nominal drive power, at first one determines the power needed to overcome the driving resistance of the vehicle. Next, the power needed to attain the desired driving performance as defined in step A) of the method is added to this driving resistance performance. Preferably, step D) of the method is repeated continuously, currently determined values always going into the computation when using an additional driving resistance.

In an alternative embodiment it is proposed that, after step D), there is performed a step D1), in which an additional driving resistance of the vehicle is ascertained, for which at least one sensor is provided, which ascertains data about the vehicle from the group including: outdoor temperature, interior temperature, angle of inclination, electrical energy consumption, and flow velocity of the air against the vehicle, wherein based on the data ascertained by the sensor the presently occurring additional driving resistance in addition to the base driving resistance is calculated by the drive controller, and, based on the additional driving resistance, an additional driving resistance performance to be overcome by the vehicle drive is calculated, which is added to the nominal drive power calculated in step D). In this embodiment of the method, similar to a previously described embodiment, an additional driving resistance of the vehicle is ascertained from current measurement values. This additional driving resistance is based on data about the driving situation and the surroundings of the vehicle. In this embodiment of the method, an additional driving resistance performance is computed from the determined additional driving resistance, which is then added to the nominal drive power as computed in step D) of the method. Thus, in this embodiment, step D1) of the method is performed independently of step D) and the powers so determined are then added. Alternatively, as described previously, a measured or otherwise determined additional driving resistance performance can go into the computation in step D) of the method and step D1) is omitted.

It is furthermore proposed that the driving resistance performance and/or the nominal drive power and/or the current drive power is calculated based on a theoretical physics equation or based on an empirically determined characteristic curve or an empirically determined characteristic map. In the computations in the method, either a formula from the natural sciences or an empirically determined relationship can serve as the basis. For example, an established physics equation can be used for the computation of the flow resistance. For the definition of the behavior of the drive motor, a corresponding engine speed/power correlation will be used, generally based on an empirically determined characteristic curve or an empirically determined characteristic map.

The problem of the disclosure is likewise solved by a drive controller for the drive of a vehicle, comprising: at least one computing unit for calculating a nominal drive power of the vehicle, at least one regulator for regulating the current drive power of the vehicle, at least one storage unit for memorizing of vehicle data, at least one base driving resistance, and at least one engine speed/power correlation of a drive motor of the vehicle, at least one data interface for data input and output, wherein the drive controller is configured to carry out a method according to one of the previously described embodiments. The drive controller according to the disclosure serves for the control and regulation of the drive of a vehicle. The vehicle may also comprise multiple drives. The drive controller comprises a computing unit (e.g., a microcontroller including a processor), a regulator, a storage, and at least one data interface for exchanging data. The drive controller according to the disclosure is configured to carry out a method according to one of the previously described embodiments. Furthermore, the drive controller regulates the current drive power of the vehicle at every moment of time. The drive controller according to the disclosure enables a simplified adapting of the driving performance of different vehicle types of a vehicle platform.

Embodiments of the disclosure provide a vehicle having at least one drive, wherein the vehicle comprises at least one drive controller according to the previously described embodiment or way for carrying out the method according to one of the previously described embodiments. The vehicle according to the disclosure comprises a drive controller according to the disclosure or other way for carrying out a method according to one of the previously described embodiments. The vehicle according to the disclosure also simplifies the adapting of the driving performance for different vehicle types of a vehicle platform.

Features, effects, and benefits which are disclosed in connection with the method also count as being disclosed in connection with the drive controller and the vehicle. The same holds, conversely, for features, effects and benefits which are disclosed in connection with the drive controller and the vehicle, which also count as being disclosed in connection with the method.

BRIEF DESCRIPTION OF THE SEVERAL VIEWS OF THE DRAWINGS

The disclosure is represented schematically in the drawing with the aid of one embodiment and shall be further described with reference to the drawing. There is shown.

DETAILED DESCRIPTION

Figure 1:
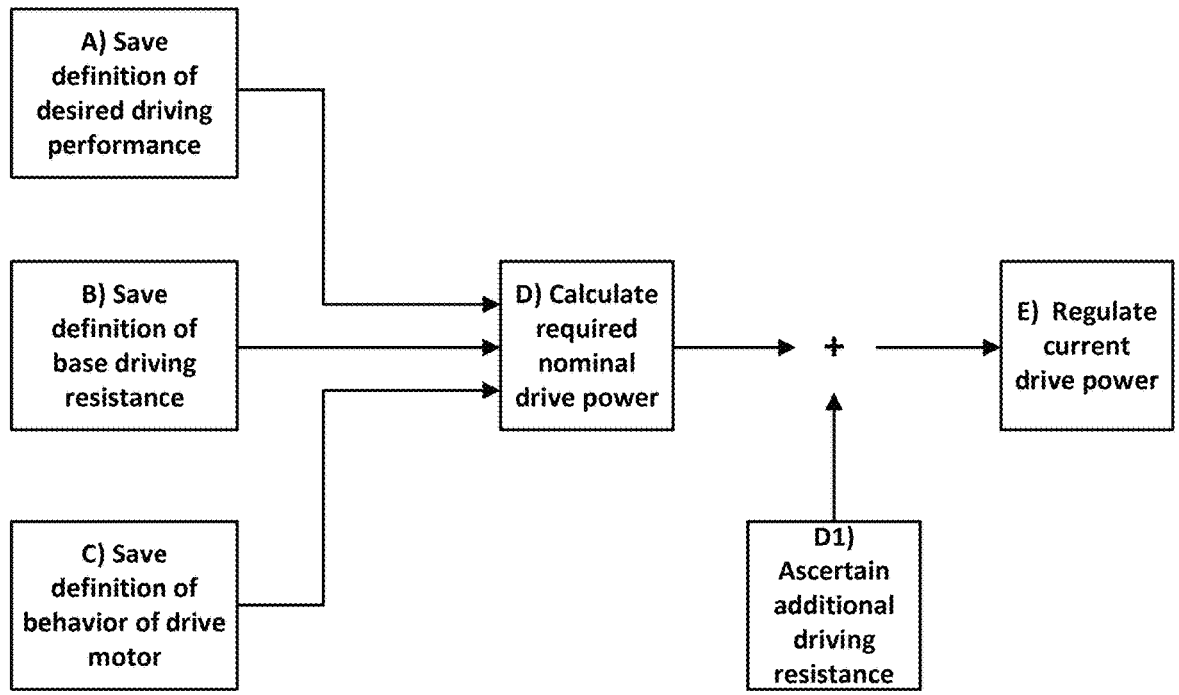
FIG. 1 shows a diagram of a method according to an embodiment of the present disclosure.

The FIGURE shows, in a diagram, one embodiment of a method according to the disclosure. The diagram or block diagram shows a method according to one embodiment of the disclosure. On the left side are shown the three steps A), B) and C) of the method, each symbolized as a separate block. In step A) of the method, a desired driving performance such as a nominal acceleration is defined and saved in a storage of a drive controller. In step B) of the method, a base driving resistance of the vehicle is defined and saved in memory. This base driving resistance includes physical data on the vehicle, which allow a computation of the base driving resistance. The base driving resistance is present in every operating state of the vehicle and must be overcome by the drive unit of the vehicle. In step C) of the method, the behavior of a drive motor of the vehicle is defined and saved in memory. This behavior is represented by an engine speed/power correlation, such as a characteristic curve. The three steps A) to C) of the method can be performed in parallel with each other or sequentially. All three steps A) to C) of the method furnish a basis for calculating the required nominal drive power in step D). The nominal drive power calculated in step D) of the method is required by the drive unit of the vehicle in order to achieve the desired driving performance as defined in step A) of the method. In the embodiment of the method represented in FIG. 1, only the data and information on the base driving resistance from step B) of the method go into the computation in step D) of the method regarding the driving resistance of the vehicle. In practice, however, it may happen that the actual driving resistance differs from the base driving resistance as calculated from the data in step B) of the method. This may occur, for example, in the case of temperature differences. Furthermore, wind or storm or also a gradient needing to be overcome may alter the driving resistance of the vehicle. Furthermore, different tire pressure may influence the driving resistance. In order to detect these differences in the driving resistance caused by external factors and to adapt the current drive power of the vehicle accordingly, so that the desired driving performance is always achieved, step D1) of the method can be performed in addition. In this step D1), an additional drag is determined, made up of current data determined at least by one sensor in or on the vehicle. Preferably, multiple sensors are provided, which determine different data and relay them to the drive controller. The at least one sensor provides data on the vehicle from the group of the outdoor temperature, the interior temperature, the angle of inclination, the electrical energy consumption, and the flow velocity of the air against the vehicle. Of course, other data can also be determined in addition to compute the additional driving resistance. In the embodiment represented in FIG. 1, in step D1) of the method, an additional driving resistance performance is calculated from the additional driving resistance alone and then added to the required nominal drive power already determined in step D) of the method. This added performance then forms an input value for performing step E) of the method, in which the current drive power of the vehicle is computed by the drive controller. Alternatively, it is also possible to use the additional driving resistance as determined in step D1) of the method as a further basis or further input quantity in step D) of the method. In this case, the nominal drive power of the vehicle is then calculated in step D) of the method based on the base driving resistance as defined in step B) of the method and the additional driving resistance as determined in an additional step B1) of the method and this is then taken directly to step E) of the method. In this case, step B1) in the block diagram should be drawn as a block, for example, beneath step C) and connected to the input of step D) of the method.

German patent application no. 102022120171.6, filed Aug. 10, 2022, to which this application claims priority, is hereby incorporated herein by reference, in its entirety.

Figure 2:
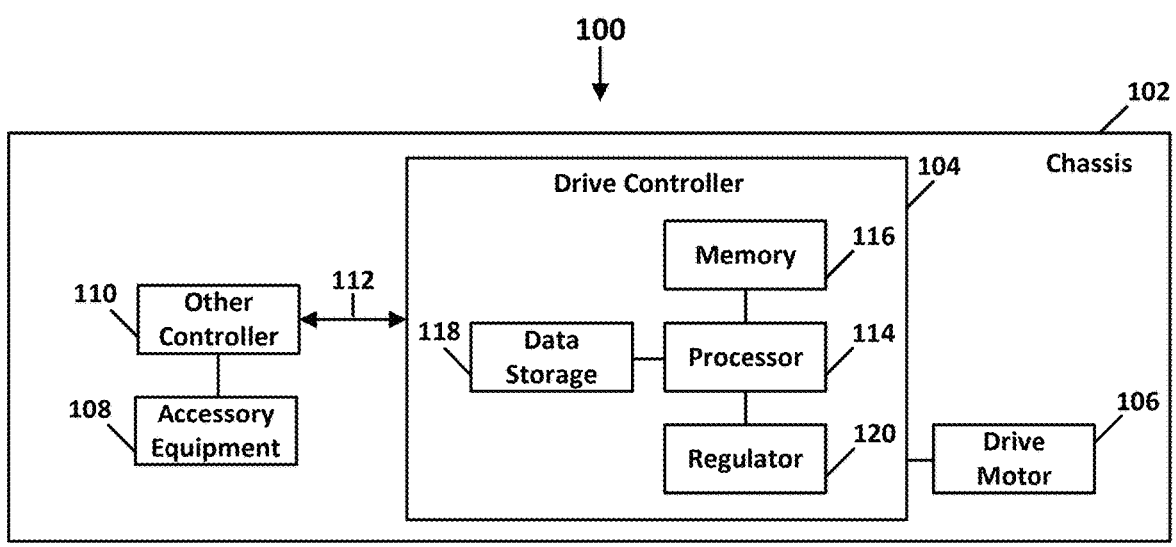
FIG. 2 shows a diagram of a motor vehicle according to an embodiment of the present disclosure.

FIG. 2 shows a diagram of a motor vehicle 100 according to an embodiment of the present disclosure. The motor vehicle 100 includes a chassis 102 on which a drive controller 104, a drive motor 106, accessory equipment 108, an other controller 110, and a data interface 112 are located. The driver controller 104 includes a processor 114, a memory 116, a data storage 118, and a regulator 120. The driver controller 104 of the motor vehicle 100 performs the method described above in connection with FIG. 1.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for adapting driving performance of a vehicle, the method comprising:
   saving a definition of a desired driving performance of the vehicle in a memory of a drive controller of the vehicle;
   saving a definition of a base driving resistance of the vehicle in the memory of the drive controller of the vehicle;
   saving a definition of a behavior of a drive motor of the vehicle in the memory of the drive controller of the vehicle, wherein the definition of the behavior of the drive motor of the vehicle includes a correlation between engine speed and power of the drive motor;
   calculating a required nominal drive power of the vehicle needed to achieve the desired driving performance, based on the base driving resistance and the behavior of the drive motor saved in the memory of the drive controller; and
   regulating, by the drive controller, a current drive power of the vehicle according to the required nominal drive power of the vehicle.

2. The method according to claim 1, further comprising:
   after the saving the definition of the behavior of the drive motor of the vehicle and before the calculating the required nominal drive power of the vehicle needed to achieve the desired driving performance, ascertaining an additional driving resistance of the vehicle for which at least one sensor is provided that ascertains data about the vehicle from a group including: an outdoor temperature, an interior temperature, an angle of inclination, an electrical energy consumption, or a flow velocity of air against the vehicle; and calculating, by the drive controller, based on the data about the vehicle ascertained by the at least one sensor, a presently occurring additional driving resistance, wherein the calculating the required nominal drive power of the vehicle is based on the additional driving resistance.

3. The method according to claim 2, wherein the calculating the required nominal drive power of the vehicle includes:

calculating a driving resistance performance to be overcome by the vehicle from the base driving resistance combined with the additional driving resistance;

adding the driving resistance performance to the desired driving performance; and determining the required nominal drive power from a sum of the driving resistance performance and the desired driving performance.

4. The method according to claim 3, wherein the driving resistance performance, the required nominal drive power, or the current drive power is calculated based on a theoretical physics equation, an empirically determined characteristic curve, or an empirically determined characteristic map.

5. The method according to claim 1, further comprising:
defining the base driving resistance by:
inputting components installed in the vehicle from a group including: a chassis, drive motors, tires, or accessory equipment, in the drive controller or in an other controller that relays data to the drive controller; and
calculating of the base driving resistance in the drive controller or in the other controller that relays data to the drive controller.

6. The method according to claim 1, further comprising:
defining the base driving resistance by:
inputting the base driving resistance upon delivery of the vehicle in the drive controller or in another controller that relays the base driving resistance to the drive controller; or
selecting the base driving resistance from a plurality of calculated base driving resistances that are saved in the memory upon delivery of the vehicle according to a selection criterion at the drive controller or at another controller that relays the base driving resistance to the drive controller.

7. The method according to claim 1, wherein the desired driving performance is an acceleration of the vehicle.

8. The method according to claim 1, wherein the desired driving performance is a mean acceleration of the vehicle from zero to a speed of 100 km/h in a nominal acceleration time.

9. The method according to claim 1, further comprising:
after the calculating the required nominal drive power of the vehicle needed to achieve the desired driving performance, ascertaining an additional driving resistance of the vehicle for which at least one sensor is provided that ascertains data about the vehicle from a group including: an outdoor temperature, an interior temperature, an angle of inclination, an electrical energy consumption, or a flow velocity of air against the vehicle;

calculating, by the drive controller, based on the data ascertained by the at least one sensor, a presently occurring additional driving resistance calculating, by the drive controller, based on the additional driving resistance of the vehicle, an additional driving resistance performance to be overcome by the vehicle; and adding the additional driving resistance performance to the required nominal drive power.

10. A drive controller for drive of a vehicle, the drive controller comprising:
at least one processor which, in operation, calculates a nominal drive power of the vehicle;
at least one regulator which, in operation, regulates a current drive power of the vehicle;
at least one storage device that stores vehicle data, at least one base driving resistance, and at least one correlation between engine speed and power of a drive motor of the vehicle;
at least one data interface which, in operation, inputs and outputs data,
wherein the at least one storage device stores a definition of a desired driving performance of the vehicle, a definition of a base driving resistance of the vehicle, and a definition of a behavior of a drive motor of the vehicle,
wherein the at least one processor, in operation, calculates a required nominal drive power of the vehicle needed to achieve the desired driving performance, based on the base driving resistance and the behavior of the drive motor saved, and
wherein the at least one processor, in operation, regulates a current drive power of the vehicle according to the required nominal drive power of the vehicle.

11. A vehicle, comprising:
at least one drive motor; and
the drive controller according to the claim 10.

* * * * *